United States Patent

[11] 3,622,175

[72] Inventors Robert F. Benz
Milwaukee, Wis.;
Philip J. Pearson, 5104 N. Lovers Lane
Road, Milwaukee, Wis. 53225
[21] Appl. No. 6,844
[22] Filed Jan. 29, 1970
[45] Patented Nov. 23, 1971
[73] Assignee
said Pearson, by said Benz

[54] SAFETY CANOPY FOR SNOWMOBILES
2 Claims, 8 Drawing Figs.
[52] U.S. Cl. .................................. 280/150 R,
180/5 R, 296/28 R, 296/104
[51] Int. Cl. ................................... B62d 33/06
[50] Field of Search ........................ 180/5, 3, 4,
6, 9.24; 296/24, 31 P, 37, 104, 28 C, 28; 244/121;
280/150

[56] References Cited
UNITED STATES PATENTS
2,777,728  1/1957  Barenyi ................. 296/137 B X
3,194,517  7/1965  Morris .................... 244/121
D. 216,784  3/1970  Martinmaas ............. 180/5

2,549,938  4/1951  Seaman .................. 296/104
2,565,919  8/1951  Hill ....................... 296/28 C
2,656,904  10/1953  Grenier ................. 180/5 UX
2,967,073  1/1961  Gagliardi ............... 296/146
3,360,295  12/1967  Reynolds ............... 296/28 C OTHER REFERENCES
Motrak Corporation Parts List, published Nov., 1966, for Motrak Corp., Minneapolis, Minn., 180/5

Primary Examiner—Richard J. Johnson
Attorney—Morsell & Morsell

ABSTRACT: A combination safety canopy and roll bar construction for snowmobiles which has a suitable framework either pivotably or slidably mounted on either side of the snowmobile frame to allow for the ingress and egress of passengers. The framework being integral with a solid transparent shield forming the canopy per se, and acts to contain and provide heat from the engine for the snowmobile occupants. The frame has U-shaped members of sufficient strength and so constructed and arranged as to form roll bars for the protection of the individuals, should the vehicle overturn.

PATENTED NOV 23 1971  3,622,175

INVENTORS
ROBERT F. BENZ
PHILIP J. PEARSON

BY

Morsell & Morsell
ATTORNEYS

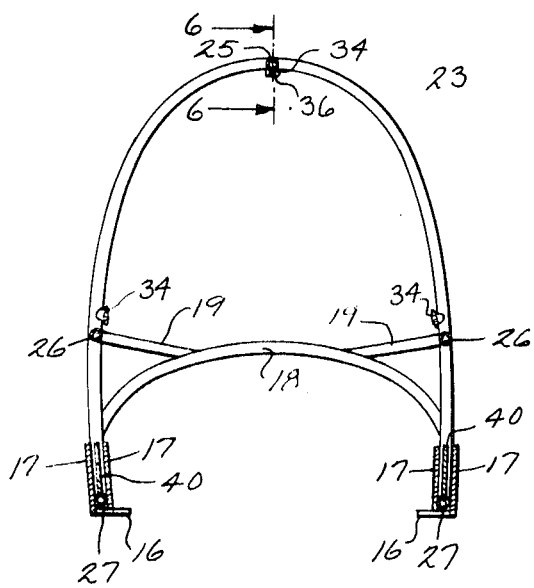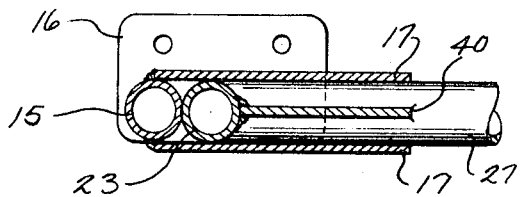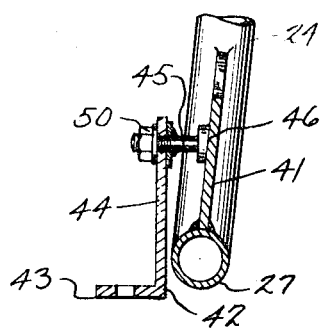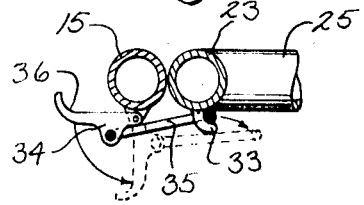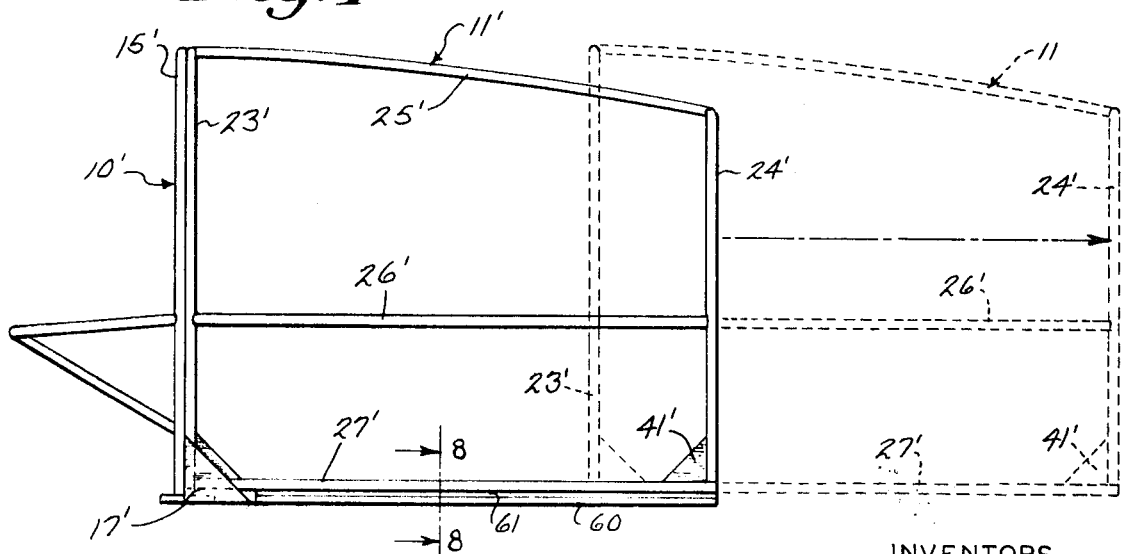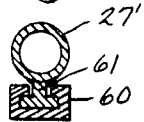

SAFETY CANOPY FOR SNOWMOBILES

Snowmobiling has become an extremely popular sport and there are numerous types of snowmobiles on the market. But, regardless of design, all snowmobiles are provided with a forwardly extending pair of ski runners capable of being turned for steering and guiding purposes, a main frame and track-type propelling means. To provide forward motion, the engine is mounted forward of the frame and suitable seats are provided over the track means. Some of these machines maintain a fair speed and are apt to overturn and injure the riders. There has even been instances of snowmobiles, in poor vision operation, running under chains and other obstructions, causing serious and critical injuries to the operator and passengers. Further, the machine, rearwardly of the engine, is open and the only protection of any sort from the elements is the addition of a small windshield. In extremely cold weather, this causes a great discomfort to the operator and riders.

There has long been a need therefore, for the provision of a cover or canopy which will protect the occupants of the vehicle from the cold by making use of the engines heat, and also, and probably most important, of providing a safety means if the vehicle is involved in an accident or turns over. All of this should be accomplished of course, without obstructing the view on all sides, particularly since in many instances the vehicles run in very close proximity, one to the other.

It is therefore a primary object of my present invention to provide a novel windshield and canopy construction which is streamlined and not only confines the heat from the engine, but also is transparent and of sufficient strength to provide a safety factor for occupants of the vehicle.

Another important object of my present invention is to provide a transparent safety windshield and/or canopy for snowmobiles, which can be readily moved out of the way to provide for the easy entrance of the operator and riders, and which can be moved to a closed locked position to completely encompass the occupants of the vehicle and to provide a safety enclosure.

A further object of my present invention is to provide a windshield construction which fits over the main cowling of the engine, and extends rearwardly and is supported by a strong U-shaped roll bar, thus giving not only a means for confining and directing heat towards the operator, but also providing a safety factor, should the vehicle be involved in an accident.

A salient feature of my present invention resides in a safety covering which extends from the cowling of the vehicle, rearwardly, for a sufficient length to direct heat toward the operator, and to provide a safety protector should the vehicle run into obstructions or overturn.

Another object of my present invention is to provide a novel safety transparent canopy having two sections, a windshield section and a movable rear canopy section, both sections having an all steel frame that gives protection to the occupants in case of accidents, while providing undistorted clear all-around vision and relief from the weather.

Still another object of my present invention is to provide a transparent safety canopy for snowmobiles having a lightweight tubular frame construction allowing for ease of installation, opening and/or removing and being of sufficient strength to protect the occupants from injury.

A further object of the invention is to provide a simple, practical, and reliable construction that is economical to manufacture, easy to assemble and positive in its operation.

With the above and other objects in view, which will more readily appear as the nature of the invention is better understood, the same consists in the novel construction, combination and arrangement of parts hereafter more fully described, illustrated, and claimed.

A preferred and practical embodiment of the invention is shown in the accompanying drawings in which;

FIG. 3 is a transverse sectional view of the framework shown in FIG. 2 of the drawings, the section being taken on the line 3—3 of FIG. 2 and looking in the direction of the arrows;

FIG. 4 is an enlarged fragmentary horizontal section taken on line 4—4 of FIG. 2 of the drawings and looking in the direction of the arrows;

FIG. 5 is a fragmentary section on the same scale as FIG. 4 of the drawings but taken on line 5—5 of FIG. 2 looking in the direction of the arrows;

FIG. 6 is a transverse section showing one means for locking the moveable frame section to the windshield frame section, the section being taken on the line 6—6 of FIG. 3 looking in the direction of the arrows;

FIG. 7 is a side elevational view similar to FIG. 2 of the drawings but showing a modified construction for opening and closing the rear canopy portion of the frame; and, FIG. 8 is a transverse vertical section taken through one of the side rails, the section being indicated by the line 8—8 in FIG. 7 of the drawings looking in the direction of the arrows.

Figure 1:
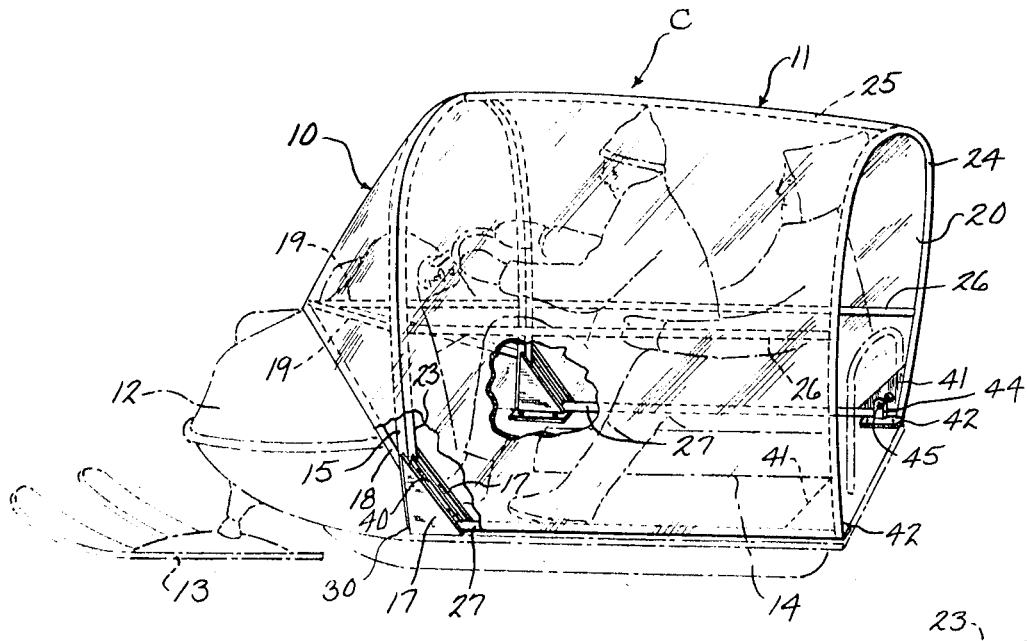
FIG. 1 is a side elevational view in perspective of one type of safety canopy arrangement with certain parts being broken away to illustrate details in its construction.

Turning now to the drawings in detail and more particularly to that form of the invention illustrated in FIGS. 1 to 6 inclusive, the letter C generally indicates a preferred form of my invention and the same includes broadly a transparent windshield section 10 and a transparent canopy section 11.

As previously brought out, there are many different types of snowmobiles on the market and, therefore, the snowmobile structure per se, forms no particular part of the present invention and can be of any desired construction. However, as illustrated in dotted lines, FIG. 1, all snowmobiles are built to provide a forward cowling 12 housing the engine; front ski members 13, which provide means for guiding the vehicle and a rearwardly extending seat 14 for the operator and riders. Generally, a snowmobile windshield is provided just forward of the dashboard and the remainder of the vehicle is open. A small side rail is provided so that the riders may place their feet thereon.

Snowmobiles are operated in relatively cold weather and in and over all types of terrain. There have been some serious accidents due to the vehicles overturning or running under low objects such as chains across driveways and fire lanes.

The present invention, therefore, is to provide a transparent safety canopy arrangement which will confine the heat given off from the engine and which does not obstruct the all around view of the operator, and which also provides a safety factor should the vehicle overturn. Thus, in its simplest form the windshield section includes a framework which is secured to the vehicle frame and is generally rigid. Therefore, the framework for the windshield 10 includes a U-shaped tubular bar 15, of sufficient strength to act as a roll bar. This U-shaped member is in turn secured to a plate 16 (FIG. 4) which may be bolted or otherwise affixed to the frame of the vehicle. Extending rearwardly, and firmly welded to the other side of the bar 15, is a pair of substantially triangular plates or gussets 17. The purpose of which will become readily apparent as the description proceeds.

The forward windshield frame also includes a forwardly directed frame bar 18 adapted to fit over the cowling 12 of the vehicle. If desired, a pair of brace bars 19, welded to bars 18 and 15, may be provided for sufficient strength. Over this framework, and fixed securely thereto, is a transparent windshield. Preferably, this windshield will be of a hard nonshattering plastic or the like.

The safety canopy section 11 of the framework is designed to extend rearwardly from the windshield section and preferably for the entire length of the machine and is open at the rear portion 20, thereof. To provide for the ease of entering the vehicle, the rear canopy section should be provided with a closed locked position and an opened position.

Figure 2:
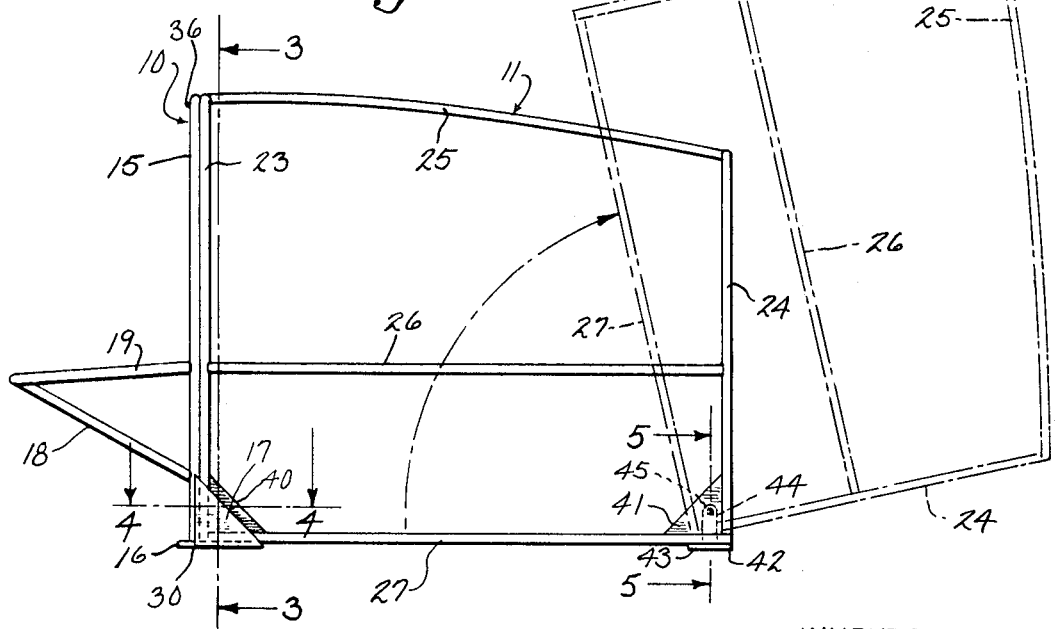
FIG. 2 is a side elevational view of the framework shown in FIG. 1 of the drawings, but removed from the vehicle and without the strong transparent outer covering.

FIG. 2 of the drawings illustrates in full lines, the framework of the safety canopy 11 in its closed locked position, and in dotted lines in its open position. To provide for this ease of entry, it should be noted that the canopy is pivoted to the frame adjacent the rear portion thereof. While the frameworks of both sections may be of any desired construction strong enough to provide for the aforementioned safety factors in the preferred form, both frameworks include an all steel tubular structure and it has been found that actually ¾-inch steel conduits and ¼-inch gussets perform the job well. The steel gussets are provided, of course, to give added strength to the corners. The aforementioned spaced gussets 17 on either side of the windshield framework act as pockets and as a heel for restraining and preventing the opening and transverse movement of the canopy section when the same is in its locked position.

Therefore, the rear canopy frame includes two special transversely aligned U-shaped roll bar members 23 and 24, respectively connected at their top and sides by longitudinally extending frame members 25 and 26, respectively. Longitudinally extending bottom frame members 27 are also provided to complete the frame. The member 25 is slightly convex in shape as is readily apparent in FIG. 2 and this adds to the streamlined effect.

The U-shaped member 23 of the canopy frame portion 11 is positioned in alignment with and is of substantially the same size and configuration as the roll bar 15 of the windshield frame member 10; and the lower end of bar 23 is firmly welded to a respective bar 27 to form a corner member 30, which fits within the aligned pieces 17, as shown more clearly in FIGS. 3 and 4 of the drawings. Thus, the forward portion of the canopy frame 11 is held against transverse movement, and as an added safety feature, roll bars 15 and 23 are latched together. This, of course, may be accomplished in any of a number of ways, and there may be a series of latches. However, in FIGS. 3 and 6 of the drawings, I have illustrated three identical latch members and each includes a hook 33 secured to bar 23 and a swinging ring latch member 34. This type of latch is of a standard construction which includes pivoted wire ring 35, and pivoted finger piece 36. To lock the two members together it is merely necessary to move the latch member to its dotted line position, (FIG. 6) place the ring 35 in alignment with hook 33 and pivot the same to its full line position where the members are then firmly secured. It should also be noted that it is desirable at the lower corners to brace the connection between bars 27 and 23 by providing triangular-shaped brace members or gussets 40 on each side. Further, the rear U-shaped roll bar 24 is also joined adjacent its lower ends to the bars 27 and again triangular-shaped braces or gussets 41 are provided.

Attention is now directed primarily to FIG. 5 of the drawings to illustrate the manner in which the rear portion of the canopy frame 11 is pivoted in relation to the vehicle frame. To provide this pivot, an L-shaped bracket 42 is utilized. The base plate 43 of which is bolted to vehicle frame and carries an upwardly extending, preferably, integral leg 44, each corner of the lower roll bar 24 is identically formed and pivotably secured. In most instances the frame bolts of the vehicle can be utilized to secure base plates 43 and windshield section plate 16, respectively. The pivotal movement of frame 11 is accomplished by an offset pivotal arrangement and includes a threaded pivot bolt 45 welded or otherwise secured at one end 46 to its respective plate 41. This threaded pivot bolt extends inwardly and through an aperture provided at the upper end of leg 44 so that it will freely rotate in relation thereto. Suitable lockwashers and locknuts indicated by reference numeral 50 may also be provided. Further, to this frame the outer transparent shatter-proof canopy may be secured.

From the description thus far, it should be readily apparent that I have provided a transparent, strong, durable canopy that can be pivoted from its full line position (FIG. 2) to its dotted line position, to provide for the ease of entering the vehicle. And that the canopy can be firmly locked in place, and thus provide a space which confines the heat eminating from the engine which completely encompasses the operator and riders, so that they may ride in safety. Also, in the event of striking an obstruction or overturning, the strong framework and particularly the roll bars 15, 23 and 24 will prevent the collapsing of the canopy and thus eliminate serious injury to occupants.

It should be readily apparent to those skilled in the art, that canopy portion 11 can be secured to the vehicle frame in any of a number of ways, to provide for the ingress and egress of passengers. One other way is illustrated in FIGS. 7 and 8 of the drawings. Here the windshield and canopy frame 10' and 11' respectively are practically identical in major frame components in that each provides for the roll bars 15', 23', 24' and the respective longitudinally extending brace members 25', 26', and 27'. The triangular plates or gussets 17' which act as guides and the rear brace plate 41' are also identically formed. The main difference however, resides in the elimination of the pivoted construction and in lieu thereof, a longitudinal track bar 60 is secured on either side of the vehicle frame; and secured to the longitudinally extending member 27 is a mating T-shaped slide member 61. Thus, in this form of the invention, canopy 11' is moved from its closed full line position (FIG. 7) to its open dotted line position in the direction of the arrows by sliding the same rearwardly and longitudinally with the vehicle frame. Otherwise, the construction and purpose is identical and the two frames 10' and 11' are locked together in use in the same manner.

It should again be stressed that I have provided a novel transparent safety canopy for all types of snowmobiles in which the only modification needed to adapt to different types of snowmobiles is in the formation of the forward windshield frame in that it must be contoured to fit and wrap around the different shaped cowlings. The rear portions 11 and 11' of the safety canopy readily fit all types of snowmobiles. It should also be noted at this time, that I could provide (not shown) a single unitary structure by extending the windshield frame rearwardly to a point approximately adjacent the rider. This would in itself provide a means to confine the heat and also provide the safety factors at least for the operator.

From the foregoing, it is believed that the features and advantages of my invention will be readily apparent to those skilled in the art and it will, of course, be understood that changes in the form, proportion and minor details of construction may be resorted to without departing from the spirit of the invention or the scope of the appended claims.

We claim:

1. In a snowmobile having a vehicle frame, a safety canopy including a frame structure of sufficient strength to give protection to the occupants, said frame including spaced front and rear upright U-shaped roll bars, longitudinally extending brace members secured to said roll bars, a strong covering supported on the canopy frame structure from the forward portion to the rear, said rear roll bar being pivotally secured adjacent the rear of said vehicle frame for tiltable movement in a vertical plane, and means on the vehicle frame for removably connecting the forward portion of the canopy in lowered position, said means comprising pocket means on the vehicle frame for receiving lower forward corner portions of the canopy to restrain movement of the canopy and brace the latter.

2. A snowmobile with a safety canopy as set forth in claim 1 in which said pocket means for each lower forward corner portion comprises a pair of spaced members on the vehicle frame having a top opening and between which a corner portion of the canopy frame structure is removably received.

* * * * *